(12) United States Patent
Garner et al.

(10) Patent No.: US 10,623,796 B2
(45) Date of Patent: Apr. 14, 2020

(54) DETECTION OF SMARTPHONE TO ENABLE CONTENT

(71) Applicant: Roku, Inc., Saratoga, CA (US)

(72) Inventors: Gregory M. Garner, Saratoga, CA (US); Joseph Hollinger, Saratoga, CA (US)

(73) Assignee: ROKU, INC., Los Gatos, CA (US)

( * ) Notice: Subject to any disclaimer, the term of this patent is extended or adjusted under 35 U.S.C. 154(b) by 48 days.

(21) Appl. No.: 14/813,703

(22) Filed: Jul. 30, 2015

(65) Prior Publication Data

US 2017/0034559 A1 Feb. 2, 2017

(51) Int. Cl.
*H04N 21/41* (2011.01)
*H04N 21/258* (2011.01)
*H04N 21/4363* (2011.01)
*H04N 21/454* (2011.01)
*H04N 21/458* (2011.01)
*H04N 21/442* (2011.01)
*H04N 21/441* (2011.01)
*H04N 21/422* (2011.01)
*H04N 21/45* (2011.01)

(52) U.S. Cl.
CPC ... *H04N 21/4126* (2013.01); *H04N 21/25891* (2013.01); *H04N 21/42203* (2013.01); *H04N 21/43637* (2013.01); *H04N 21/441* (2013.01); *H04N 21/44218* (2013.01); *H04N 21/44227* (2013.01); *H04N 21/4532* (2013.01); *H04N 21/4542* (2013.01); *H04N 21/4583* (2013.01)

(58) Field of Classification Search
CPC ......... H04N 21/4126; H04N 21/42204; H04N 21/43615; H04N 21/43637; H04N 21/4383; H04N 21/4542; H04N 21/6543; G11B 27/105; G06Q 30/02
USPC .................. 725/26–29, 92; 386/296; 709/201
See application file for complete search history.

(56) References Cited

U.S. PATENT DOCUMENTS

| | | | | |
|---|---|---|---|---|
| 8,350,694 B1 * | 1/2013 | Trundle | ................. | G08B 25/08 340/539.11 |
| 9,669,298 B2 * | 6/2017 | Andrews | ................. | H04M 1/22 |
| 2003/0073432 A1 * | 4/2003 | Meade, II | .............. | G08C 17/02 455/420 |

(Continued)

FOREIGN PATENT DOCUMENTS

WO WO-2014-007754 A2 1/2014
WO WO-2017/019691 A1 2/2017

OTHER PUBLICATIONS

U.S. Appl. No. 14/813,766, filed Jul. 30, 2015, entitled "Mobile Device Based Control Device Locator".

(Continued)

*Primary Examiner* — Brian T Pendleton
*Assistant Examiner* — Alan H Luong
(74) *Attorney, Agent, or Firm* — Sterne, Kessler, Goldstein and Fox P.L.L.C.

(57) ABSTRACT

Disclosed herein are system, method, and computer program product embodiments for detecting a smart phone to enable content. An embodiment operates by detecting that a mobile device is within a vicinity of a media device. A different set of media options corresponding to the mobile device is determined. The media device is configured with the different set of media options. An indication that the media device has been configured with the different set of media options is provided.

19 Claims, 5 Drawing Sheets

(56) References Cited

U.S. PATENT DOCUMENTS

| | | | |
|---|---|---|---|
| 2004/0048571 A1 | 3/2004 | Kiyose | |
| 2007/0109914 A1 | 5/2007 | McFarland | |
| 2007/0124785 A1 | 5/2007 | Marsico | |
| 2007/0209009 A1 | 9/2007 | Huang | |
| 2008/0060007 A1* | 3/2008 | Matsubayashi | H04N 5/44543 725/39 |
| 2008/0304361 A1 | 12/2008 | Peng et al. | |
| 2009/0158162 A1* | 6/2009 | Imai | H04N 5/4403 715/734 |
| 2009/0221298 A1 | 9/2009 | Hanner | |
| 2010/0031306 A1 | 2/2010 | Pandey et al. | |
| 2010/0066904 A1* | 3/2010 | Schindler | H04N 5/44513 348/468 |
| 2010/0107185 A1 | 4/2010 | Shintani | |
| 2010/0152899 A1 | 6/2010 | Chang et al. | |
| 2010/0153885 A1* | 6/2010 | Yates | G06F 3/0482 715/841 |
| 2010/0289644 A1 | 11/2010 | Slavin et al. | |
| 2011/0016492 A1* | 1/2011 | Morita | H04N 5/44543 725/58 |
| 2011/0069940 A1* | 3/2011 | Shimy | G11B 27/105 386/296 |
| 2011/0164175 A1* | 7/2011 | Chung | H04N 21/4126 348/468 |
| 2011/0183603 A1 | 7/2011 | Malik | |
| 2012/0026837 A1 | 2/2012 | Li et al. | |
| 2012/0057580 A1 | 3/2012 | Hansen et al. | |
| 2012/0066626 A1 | 3/2012 | Geleijnse et al. | |
| 2012/0151529 A1 | 6/2012 | Andersson | |
| 2012/0311635 A1* | 12/2012 | Mushkatblat | H04N 21/4788 725/43 |
| 2013/0027613 A1* | 1/2013 | Kim | H04N 21/4126 348/563 |
| 2013/0185368 A1* | 7/2013 | Nordstrom | H04L 51/32 709/206 |
| 2013/0304789 A1* | 11/2013 | Herlein | G06Q 30/02 709/201 |
| 2014/0075575 A1 | 3/2014 | Kim et al. | |
| 2014/0249927 A1 | 9/2014 | De Angelo | |
| 2015/0121406 A1 | 4/2015 | Chai et al. | |
| 2015/0189475 A1 | 7/2015 | Schillings | |
| 2015/0193433 A1 | 7/2015 | Dykeman et al. | |
| 2016/0112760 A1 | 4/2016 | Kosseifi et al. | |
| 2016/0127874 A1* | 5/2016 | Kingsmill | H04W 4/80 455/456.1 |
| 2017/0030999 A1 | 2/2017 | Garner et al. | |
| 2017/0034560 A1 | 2/2017 | Garner et al. | |

OTHER PUBLICATIONS

International Search Report and Written Opinion of the International Searching Authority for International Application No. PCT/US2016/043879, dated Oct. 20, 2016 (11 pages).

Non-Final Office Action dated Sep. 28, 2016 in U.S. Appl. No. 14/958,283 (25 pages).

Non-Final Office Action dated Nov. 15, 2016 in U.S. Appl. No. 14/958,283 (26 pages).

Final Office Action dated Feb. 24, 2017 in U.S. Appl. No. 14/958,283 (33 pages).

International Search Report and Written Opinion of the International Searching Authority for International Application No. PCT/US2016/044054, dated Oct. 21, 2016 (11 pages).

Zhang, Yushi et al., "A Comparative Study of Time-Delay Estimation Techniques Using Microphone Arrays", School of Engineering Report No. 619, Department of Electrical and Computer Engineering, The University of Auckland, Private Bag 92019, 2005, (57 pages).

Khaddour, Hasan, "A Comparison of Algorithms of Sound Source Localization Based on Time Delay Estimation", Department of Telecommunications FEEC, Brno University of Technology, Elektrorevue, vol. 2, No. 1, pp. 31-37, Apr. 2011.

Extended European Search Report dated Nov. 15, 2018 in European Application No. 16831242.9, 9 pages.

Extended European Search Report dated Feb. 12, 2019 in European Application No. 16831198.3, 9 pages.

Final Office Action dated Oct. 5, 2018 in U.S. Appl. No. 14/958,283 (43 pages).

Non-Final Office Action dated Apr. 18, 2019 in U.S. Appl. No. 14/958,283 (39 pages).

Non-Final Office Action dated Jan. 11, 2018 in U.S. Appl. No. 14/958,283 (37 pages).

Non-Final Office Action dated Jan. 9, 2018 in U.S. Appl. No. 14/813,766 (12 pages).

* cited by examiner

DETECTION OF SMARTPHONE TO ENABLE CONTENT

BACKGROUND

Field

This disclosure is generally directed to the detection of a smart phone to enable content.

Background

Different users have different preferences when it comes to the types of television entertainment they view. However, with standard cable and satellite boxes there is no way to customize the viewing preferences on a per-user basis. Instead, each viewer has the same viewing experience, regardless of their individual viewing preferences.

SUMMARY

Provided herein are system, apparatus, article of manufacture, method and/or computer program product embodiments, and/or combinations and sub-combinations thereof, for the solid-state capture of broadcast media.

An embodiment includes a computer implemented method for the detection of a smart phone to enable content. The method may operate by detecting that a mobile device is within a vicinity of a media device, wherein the media device is configured with a default set of media options for operating the media device; determining a different set of media options corresponding to the mobile device, wherein the different set of media options includes at least one of an enablement or disablement of an operation of the media device that differs from the default set; configuring the media device with the different set of media options; and providing an indication that the media device has been configured with the different set of media options.

Another embodiment includes a system for the detection of a smart phone to enable content. The system may include at least one processor and a memory coupled to the at least one processor and configured to detect that a mobile device is within a vicinity of a media device, wherein the media device is configured with a default set of media options for operating the media device; determine a different set of media options corresponding to the mobile device, wherein the different set of media options includes at least one of an enablement or disablement of an operation of the media device that differs from the default set; configure the media device with the different set of media options; and provide an indication that the media device has been configured with the different set of media options.

A further embodiment includes a tangible computer-readable device having instructions stored thereon that, when executed by at least one computing device, causes the at least one computing device to perform operations. The operations may include detecting that a mobile device is within a vicinity of a media device, wherein the media device is configured with a default set of media options for operating the media device; determining a different set of media options corresponding to the mobile device, wherein the different set of media options includes at least one of an enablement or disablement of an operation of the media device that differs from the default set; configuring the media device with the different set of media options; and providing an indication that the media device has been configured with the different set of media options.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for the detection of a smart phone to enable content.

Figure 1:
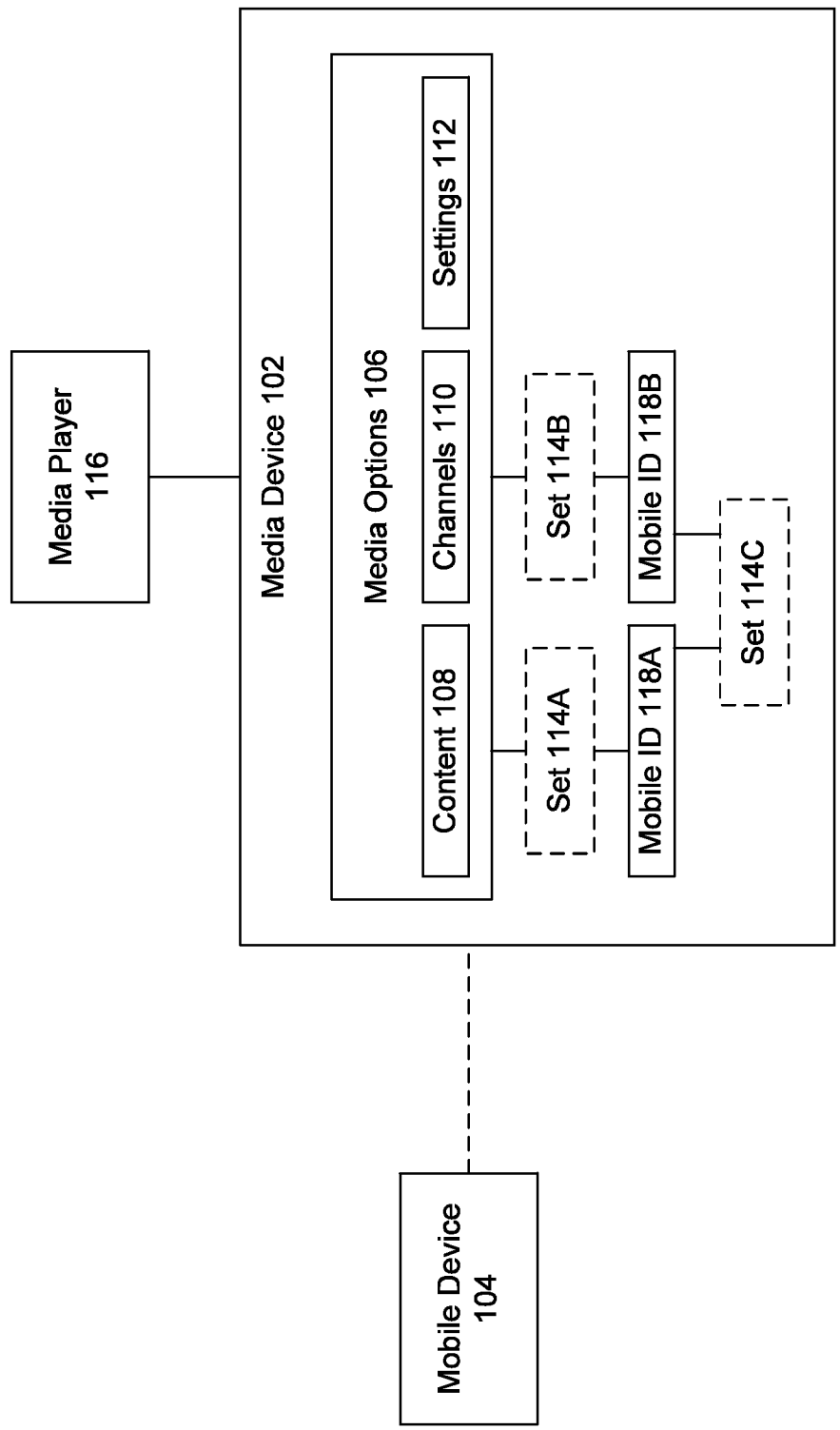
FIG. 1 is a block diagram of a system for the detection of a smart phone to enable content, according to an example embodiment.

FIG. 1 is a block diagram of a system 100 for the detection of a smart phone to enable content, according to an example embodiment.

Media device 102 may detect the presence of a mobile device 104 and enable or disable media options 106 corresponding to preferences or configurations associated the detected mobile device 104. Media options 106 may provide for customized content 108, channels 110, and other settings 112 for a user to whom mobile device 104 is registered when the mobile device 104 is detected to be within a vicinity of media device 102.

In an example embodiment, system 100 may enable a parent (e.g., or other administrator) to configure media device 102 to enable/disable content 108 that may be viewed by a child (e.g., or other user). For example, the child may have a mobile device 104 (e.g., laptop, mobile phone, remote control, etc.) registered with or otherwise communicatively coupled to media player 102. The parent may then configure media options 106 to disable certain channels 110 when the child's media device 104 is detected to be within a vicinity of media device 102, or another action.

For example, disabled channels 110 may not be viewable via an online channel guide, or may not be selectable for viewing or recording via media device 102. Or, for example, media device 102 may provide a warning or automatically change the channel 110 or what appears on a media player 116 if channel 110 that is being viewed is restricted to a child's device 104 that has been detected. For example, the channel 110 being viewed by an adult may be on the disabled list of channels 110 for a child, and the channel may be changed to another channel that is enabled for both the adult set 114A and child set 114B. Or, for example, if multiple mobile devices 104 are detected belonging to both adults and children, another set 114C of media options 106 may be provided, which may include an action may be performed which may or may not include changing the channel 110 that is not part of the child's viewing options 114B, or a union or intersection of sets 114A and 114B, or any other configuration. Configuration options for sets 114 may vary by which device(s) 104 are detected, which programming (e.g., channels 110, content 108) is available, and the time of day/day of week, etc., and such configuration options may be programmed by an owner or administrator of media device 102 (such as, for example, a parent).

In another embodiment, a particular user with a registered mobile device 104 may have a preference towards sports. Then, for example, when the mobile device 104 is detected within a vicinity of media device 102, the channel guide (e.g., settings 112) may first show sports channels or those sports channels of greatest interest to the user as may be configured via media options 106. Or, for example, media device 102 may alert the user on mobile device 104 and/or on media player 116 as to which sports games are currently viewable or available to the user.

Depending on which mobile device(s) 104 are detected within a vicinity of media device 102, media device 102 may enable, disable, or otherwise activate, deactivate, or configure different content 108, channels 110, and other settings or configurations 112 on media device 102, hereinafter referred to as media options 106. Media options 106, as used herein, may refer to any individual media option (e.g., content 108, channels 110, settings 112), subset of media options, or the collective group of media options available to or otherwise configurable by a user as default options or across one or more sets 114.

Other features of media device 102 and/or media player 116 (as well as other home theater and/or multimedia components) may also be customized depending on detection of a registered mobile device 104. These features include but are not limited to volume level, closed captioning, audio mode, video mode, and/or any other feature or characteristic of media players 116, media devices 102, and/or other home theater and multimedia components.

Media player 116 may be a device configured to receive data and process or otherwise output the data via media device 102. Media player 116 may include a television, monitor, tablet, computer, radio, speakers, or other media input and/or output device that is configured to output video, audio, and/or other media.

Media device 102 may be any device configured to receive data over a communication network that is output via a media player 116. Media device 102 may be or include functionality associated with a satellite box, cable box, media server device, streaming device, DVD, DVR, modem, or other box or device connected to a network or other service (e.g., satellite, cable, over the air, or Internet) that receives data to be stored, buffered, and/or output via media player 116. In an embodiment, media player 116 and media device 102 may be a single device or multiple devices that communicate via a wired or wireless connection.

In an embodiment, media device 102 may include or otherwise be connected to a tuner. A tuner may receive media, such as television, radio, or other content 108 transmit from one or more network services or content providers. For example, the tuner may be a wide-band or narrow-band television tuner that converts television transmissions (e.g., radio frequency analog, or digital transmissions) into audio and/or video signals, which can be used to produce sound and pictures on a subscriber's television, computer, or other media player 116. The tuner may receive packets of data via a satellite, cable, or other communication system (including over the air or the Internet). In other embodiments, the tuner may receive different types of media, including but not limited to video and/or sound.

In an embodiment, the tuner of media device 102 may receive data or other content 108 received over one or more channels 110. Channels 110 may be television, radio, or other streaming/static service channels that provide particular content 108 that is associated with or provided by that channel 110. In an embodiment, different channels 110 may provide varying types of content 108, directed to different subjects or interest areas. Example channels 110 may include sports channels, adult-only channels, children directed channels, cartoon channels, local sports channels, pay-per-view channels, team specific sports channels, news channels, channels that are provided based on a geographic location of media device 102, cooking channels, history channels, nature channels, movie channels, or other channels. The channels media option 110 could be set to enable/disable particular channels 110, or general categories of channels (e.g., sports-only, cartoon-only, family-friendly, nature, etc.).

Content 108 may include streaming, live, real-time, or previously stored (e.g., on a local memory or on-demand from a broadcast or other service provider) content. Content 108 may include movies, sports, shows, music, or content of any other genre or type. Content 108 may include audio, video, and/or other multimedia that may be received by media device 102. The content media option 108 could be set to enable/disable particular content by title, genre, actors, ratings, reviews, release year, recently added, or other categories of content.

Media device 102 may have a subscription through a service provider (e.g., satellite, cable, or over the air) to receive particular channels 110 and/or content 108. The subscription may indicate from which channels 110 media device 102 may receive content 108. The subscription may include special authorization to receive particular content 108, such as pay-per-view movies, events, or other media.

The transmissions from the broadcast service (e.g., satellite, cable, over the air, or Internet company) may be broadcast, multicast, simulcast, or unicast transmissions. In an embodiment, a tuner in media device 102 may receive the content 108, channels 110, and/or other data (e.g., such as subscription information, channel guide, etc.) from the broadcast service for display on media player 116.

In an embodiment, media device 102 may include, without limitation, a cable box, DVD player, satellite receiver, modem, mobile phone, or computer. These boxes may include communication ports, memories, processors or other conventional computer components, including a wired and/or wireless communication with other devices (including other media devices 102 or mobile device 104). For example, a broadcast or streaming service may provide content 108 or provide access to one or more channels 110 via an application installed or a device (e.g., computer or mobile phone), or via a website that is accessible over the Internet or other network.

The memories of media device 102 may include local memory and/or network-accessible memory (e.g., such as cloud storage). The memory may be used to store received content 108, settings 112, subscription information (e.g., channels or pay-per-view purchases), and sets 114. The memory may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

Media options 106 of media device 102 may be configured based on a per-user or per-mobile device 104 basis. For example, a mobile device 104 may be registered with or otherwise communicatively coupled to media device 102 and may be assigned or associated with a mobile ID 118. The mobile ID 118 may be a telephone number, MAC (media access control) address, IP (internet protocol) address, username, serial number, or other unique identifier that corresponds to a particular mobile device 104.

Mobile ID 118 may be configured in or otherwise associated with a configured set of media options 106, the configured set of media options being referred to as set 114. Set 114 may include configured content 108, channels 110, and/or settings 112. Then, for example, if/when media device 102 detects the presence of a mobile device 104 associated with a mobile ID 118, media device 102 may activate or otherwise be configured with the corresponding set 114 of media options 106. Activating set 114 may change or otherwise adjust the viewing experience of the user(s) viewing or hearing content 108 from media device 102, or otherwise interacting with or operating media device 102.

Sets 114 may be used to customize the viewing, listening, and/or operating experience for one or more users of media device 102. A set 114 may be associated with or correspond to one or more mobile IDs 118. For example, a parent who has young children with mobile devices 104, may set up a child-only set 114 and register each child's mobile device 104/mobile ID 118 with the set 114. Then, for example, if any of the registered child mobile IDs 118 are identified as being within a particular vicinity (e.g., which may vary by mobile ID 118) of media device 102, the (corresponding) child-only set 114 may be activated on media device 102. Each child may be associated with its own unique set 114, or all children may share a set 114. In an embodiment, a configured set 114 may be used as the default set when no mobile devices 104 are detected or upon system start up.

Figure 3:
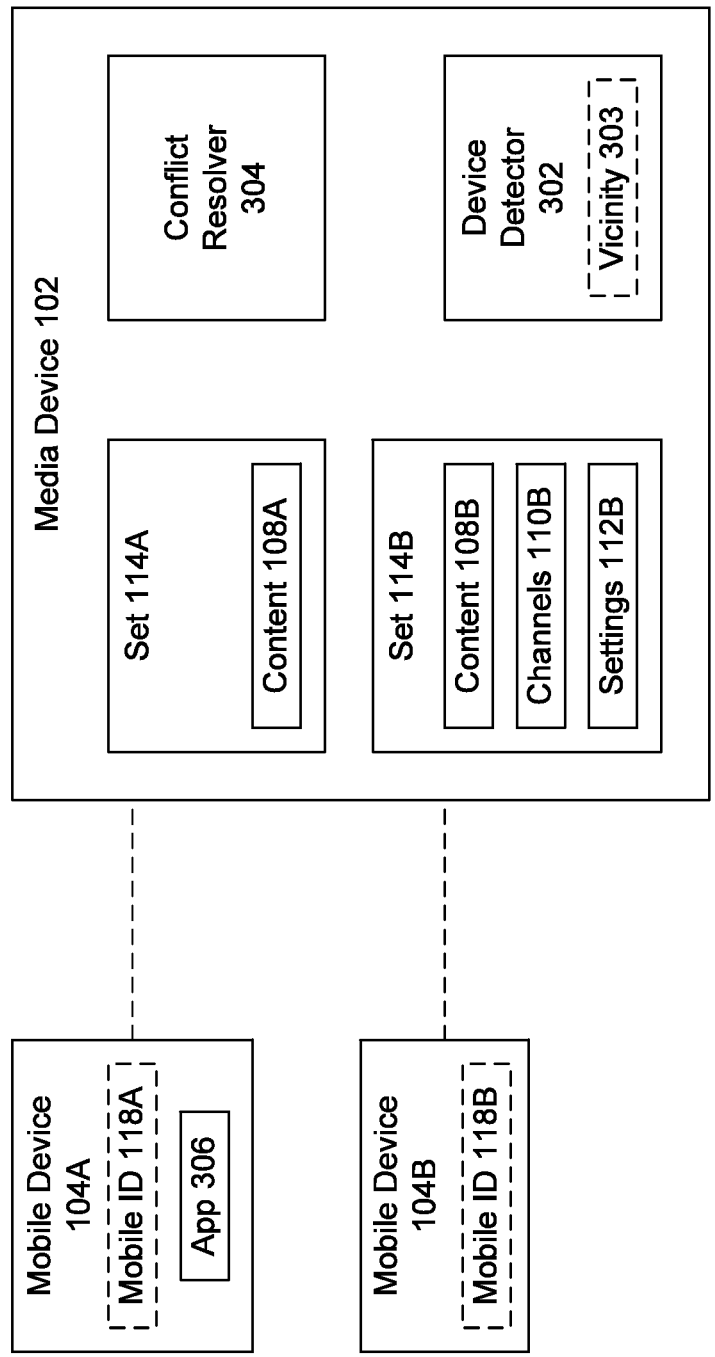
FIG. 3 is a block diagram of a system for the detection of a smart phone to enable content, according to another example embodiment.

A device detector 302 (as shown in FIG. 3) of media device 102 or otherwise communicatively coupled with media device 102 may determine which mobile device(s) 104 are within a particular vicinity 303 of media device 102 by any number of methods. For example, vicinity 303 may be determined by detecting a peer-to-peer, or other direct or indirect, connection between mobile device 104 and media device 102. The device detector 302 may detect and communicate with mobile device(s) via Bluetooth, NFC (near field communication) technology, cellular, WIFI and/or other communication mediums and technologies.

Figure 5:
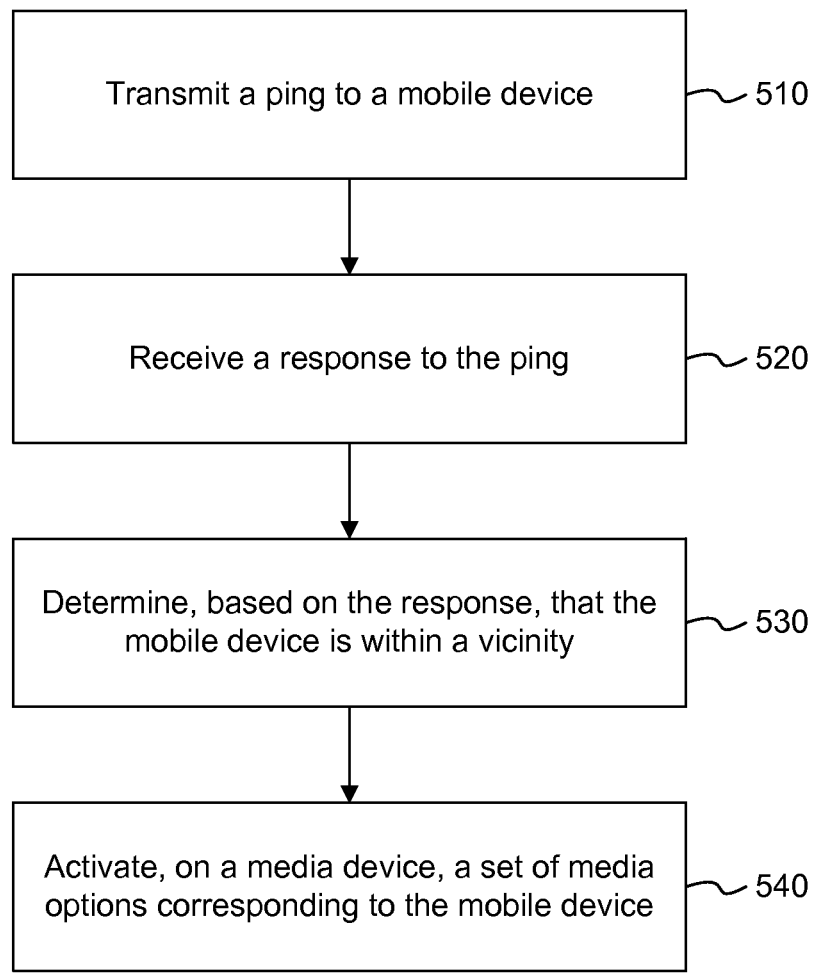
FIG. 5 is a flowchart for a method for the detection of a smart phone to enable content, according to another embodiment.

For example, using any of these technologies, device detector 302 may issue an electronic ping. FIG. 5 is a flowchart for a method for the detection of a smart phone to enable content, according to another embodiment.

In step 510, a ping may transmit to a mobile device. For example, device detector 302 may transmit an electronic ping to a mobile device 104A. The ping may an audible ping that is received by a microphone on mobile device 104A, or a ping transmit via app 306. In an embodiment, this ping could be issued via a text message to a specified address over a cellular connection.

In step 520, a response to the ping may be received. For example, mobile device 104A may receive the ping and transmit a response using an audio tone, text message, or other another message using app 306. In an embodiment, the ping may be a broadcast or general ping, and any mobile device 104A or 104B receiving such ping would respond.

In step 530, it is determined, based on the response, that mobile device is within a vicinity of the media player 102. For example, device detector 302 may receive the ping from mobile device 104A. The response may include information necessary to determine a location of mobile device 104A, including whether device 104A is within vicinity 303. In an embodiment, the response may include mobile ID 118 of the responding mobile device 104.

In step 540, a set of media options is activated on the media device corresponding to the responding mobile device. For example, device detector 302 may detect that mobile device 104A is within vicinity 303 and activate or otherwise signal set 114 to be activated on media device 102. In an embodiment, if device detector 302 detected the presence of both mobile devices 104A and 104b to be within vicinity 303, the conflict between sets 114A and 114B may be resolved by conflict resolver 304 as described herein.

Returning to FIG. 3, alternatively or in addition, an audio determination may be used by device detector 302. In audio determination, an audible tone may be sent from media device 102 to mobile device 104 that is received by a microphone in mobile device 104. Based on the time between the transmission and receipt, media device 102 may determine a distance between media device 102 and mobile device 104. In an embodiment, mobile device 104 may send a sound or ping back to media device 102 to determine vicinity 303.

In an embodiment, vicinity 303 or distance between mobile device 104 and media device 102 may be determined based on a signal strength of mobile device 104 if both media device 102 and mobile device 104 are connected to the same wireless (e.g., Wi-Fi) network. In another network embodiment, media device 102 may determine whether mobile device 104 is present on a network, and its presence may indicate that mobile device 104 is within vicinity 303 of media device 102. In another embodiment, a global positioning system (GPS) location of mobile device 104 may be detected, and determined whether or not it is within a predefined or particular vicinity 303 of media device 102. An example of this is described in patent application titled "Mobile Device Based Control Device Locator" which is assigned patent application Ser. No. 14/813,766, filed Jul. 30, 2015, which is incorporated by reference herein in its entirety.

Example settings for vicinity 303 may include being within the same room, being within a specified distance (e.g., meters or feet), or being on the same network as media device 102. In an embodiment, the vicinity 303 necessary for activation of a set 114 may vary by mobile ID 118, mobile device 104, and/or set 114. For example, of two mobile devices 104A and 104B that are determined to be the same distance from media device 102, one may be determined to be within vicinity 303 of media device 102, and one may not, based on settings 112 of the corresponding sets 114.

Returning to FIG. 1, each set 114 may include a configuration of any media options 106 available to the user. Sets 114 may include the access to, restrictions from, and/or configurations of particular content 108, channels 110, settings 112, and may vary by which mobile device(s) 104 are within a vicinity of media device 102 and may vary by time of day or day of the week as well. For example, a mobile ID 118 of mobile device 104 may be prevented from watching television or a particular program after 9:00 pm. Then, for example, if the mobile ID 118 is detected within the vicinity of media device 102 after 9:00 pm, media device 102 may shut down, discontinue viewing capabilities, or otherwise provide a warning to the user. Or, for example, set 114 for a mobile device 104 may be restricted from viewing a particular channel 110 during a set period of time.

A conflict resolver 304 (as shown in FIG. 3) of media device 102 may be configured to determine how to react when two or more mobile devices 104 with conflicting sets 114 are detected within vicinity 303. In an embodiment, different mobile IDs 118A and 118B may be assigned priorities. Then, for example, the set 114 corresponding to the mobile ID 118 with the highest priority may be activated by conflict resolver 304. The priorities may vary by time or day of the week. Or, for example, if the mobile ID 118A is associated with an adult and the mobile ID 118B is associated with a child, and both are detected to be within a vicinity 303 of media device 102, conflict resolver 304 may resolve the conflict.

For example, conflict resolver 304 may activate the adult viewing set 114A, activate the child viewing set 114B, activate a different set 114 defined for such a conflict. In an embodiment, a union or intersection of two or more sets 114A and 114B may be activated. Or, for example, the mobile device 104A may be prompted for a decision on which set 114 to activate.

Returning to FIG. 1, in an embodiment, a visual display (as may be shown on media player 116 and/or media device 102) associated with media device 102 may indicate which set 114 is activated. For example, each set may be named and/or be associated with a particular color or color combination on a menu system of media device 102 or a light on media device 102 may change colors. Then, for example, a viewer could determine which set 114 is activated.

Media options 106 may include sound options too, for example customized settings of a sound system associated with or connected to media device 102. Then, for example, based on the detection of a particular mobile device 104, the sound options (e.g., volume, bass, or other settings) may be adjusted to the preferences set by that user. If media player 116 is communicatively coupled to media device 102, then viewing options on media player 116 may be adjusted in media options 106 as well. For example, hue, color, contrast, brightness, or other options may automatically be adjusted upon the activation of different sets 114.

In an embodiment, media device 102 may be configured to only allow an adjustment of one or more of the sets 114 if a particular administrator or master mobile device 104 is detected. In another embodiment, the presence of a particular mobile device 104 may be enabled to adjust settings 112 and/or further restrict content 108/channels 112 to be viewed within the set 114, but may not be allowed to add new channels 112/content 108 not previously authorized (e.g., without a presence of a master or administrator mobile device 104).

Figure 2:
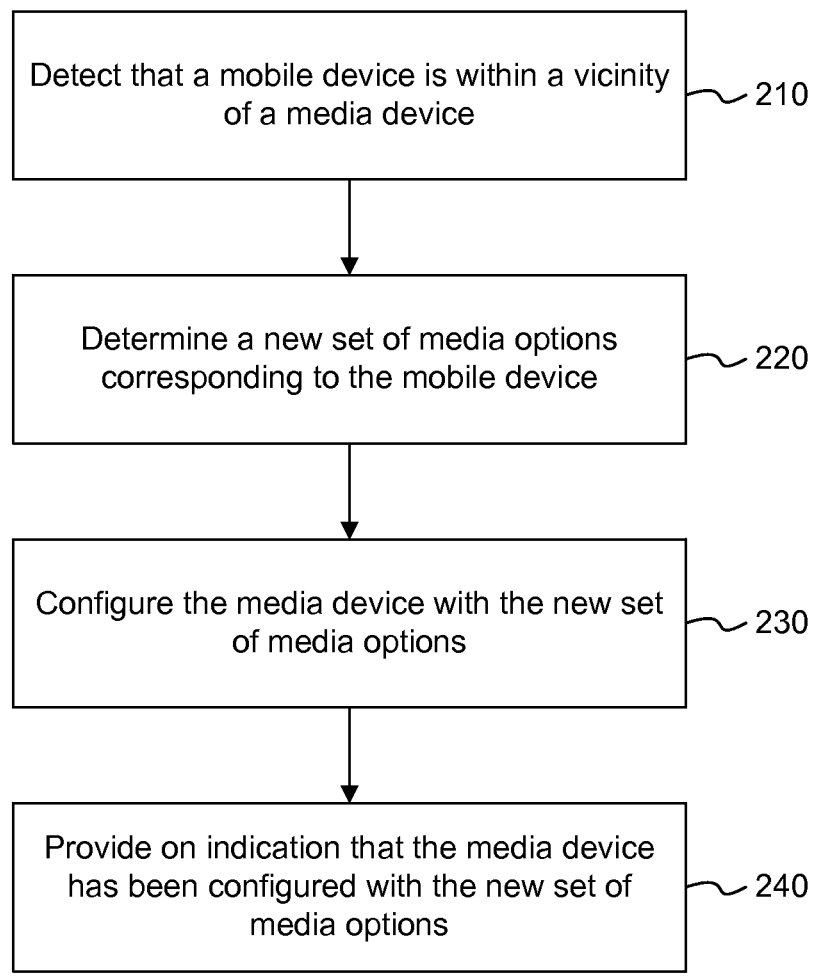
FIG. 2 is a flowchart for a method for the detection of a smart phone to enable content, according to an embodiment.

FIG. 2 is a flowchart for a method 200 for the detection of a smart phone to enable content, according to an embodiment. Method 200 can be performed by processing logic that can comprise hardware (e.g., circuitry, dedicated logic, programmable logic, microcode, etc.), software (e.g., instructions running on a processing device), or a combination thereof.

In step 210, a mobile device is detected within a vicinity of a media device. For example, media device 102 may determine that mobile device 104 is within a vicinity 303 of media device 102. The determination may be made, for example, based upon a presence of mobile device 104 on a network or through direct/indirect communication with mobile device 104. If no mobile device 104 is detected within vicinity 303 of media device 102, media device 102 may activate a default set 114 of options.

In step 220, a different set of media options corresponding to the mobile device are determined. For example, the detected mobile device 104 may correspond to a mobile ID 118 that is associated with or corresponds to a set 114 of media options 116. The set 114 may enable/restrict content 108 and/or channels viewable to a user associated with the detected mobile device 104 based on age or other restrictions. For example, channel or content ratings that may be accessible may be used to set restrictions for a set 114. If multiple devices 104 with different sets 114 are detected, media device 102 may prompt the users as to which set 114 is to be activated, may resume operation with the current 114, or perform another preconfigured set-conflict activity.

In step 230, the media device is configured with the different set of media options. For example, based on the set-conflict activity, or the detection of a registered mobile device 104, media device 102 may activate the correspond set 114.

In step 240, an indication that the media device has been configured with the new set of media options is provided. For example, media device 102 may notify or signal the user that a different set 114 has been activated. Or, for example, media device 102 may change the channel 110, restrict content 108, power off, or perform another activity corresponding to the media options 106 configured for the set 114.

FIG. 3 is a block diagram of a system 300 for the detection of a smart phone to enable content, according to another example embodiment.

As discussed above, media device 102 may include a conflict resolver 304 and device detector 302. The device detector 302 may determine which device(s) 104 are within a vicinity 303 of media device 102. And if multiple devices 104A and 104B are detected within vicinity 303, then conflict resolver 304 may determine which media options 106 to activate or how to resolve the conflict.

In an embodiment, upon a detection of mobile device 104B, conflict resolver 304 may determine that the newly detected mobile device 104B is not authorized or enabled to view a currently selected channel 110B. Then, for example, conflict resolver 304 may signal media device 102 on how to respond to the conflict. Example responses include, but are not limited to, pausing/buffering the current channel 110 and informing the users of the conflict, recording the current channel 110 and changing the channel, or performing any other actions.

In the example shown, set 114B may have configurations for content 108B, channels 110B, and settings 112B. Set 114A however may only have configurations for content 108A. In such a scenario, if there is no conflict, channels 110B and settings 112B from set 114B. Conflict resolver 304 may then resolve any conflicts that exist between content 108A and content 108B.

In an embodiment, mobile devices 104 may communicate with media device 102 (and vice versa) through an app 306. App 306 may be an application or program installed on or accessible by (e.g., over the Internet) mobile devices 104. Through communication via app 306, mobile device 104 may change channels, adjust sets 114, or perform other operations on media device 102. In an embodiment, device detector 302 may communicate with or detect the presence of mobile device 104 via app 306. For example, app 306 may communicate its associated mobile ID 118 to media device 102 as discussed above.

Figure 4:
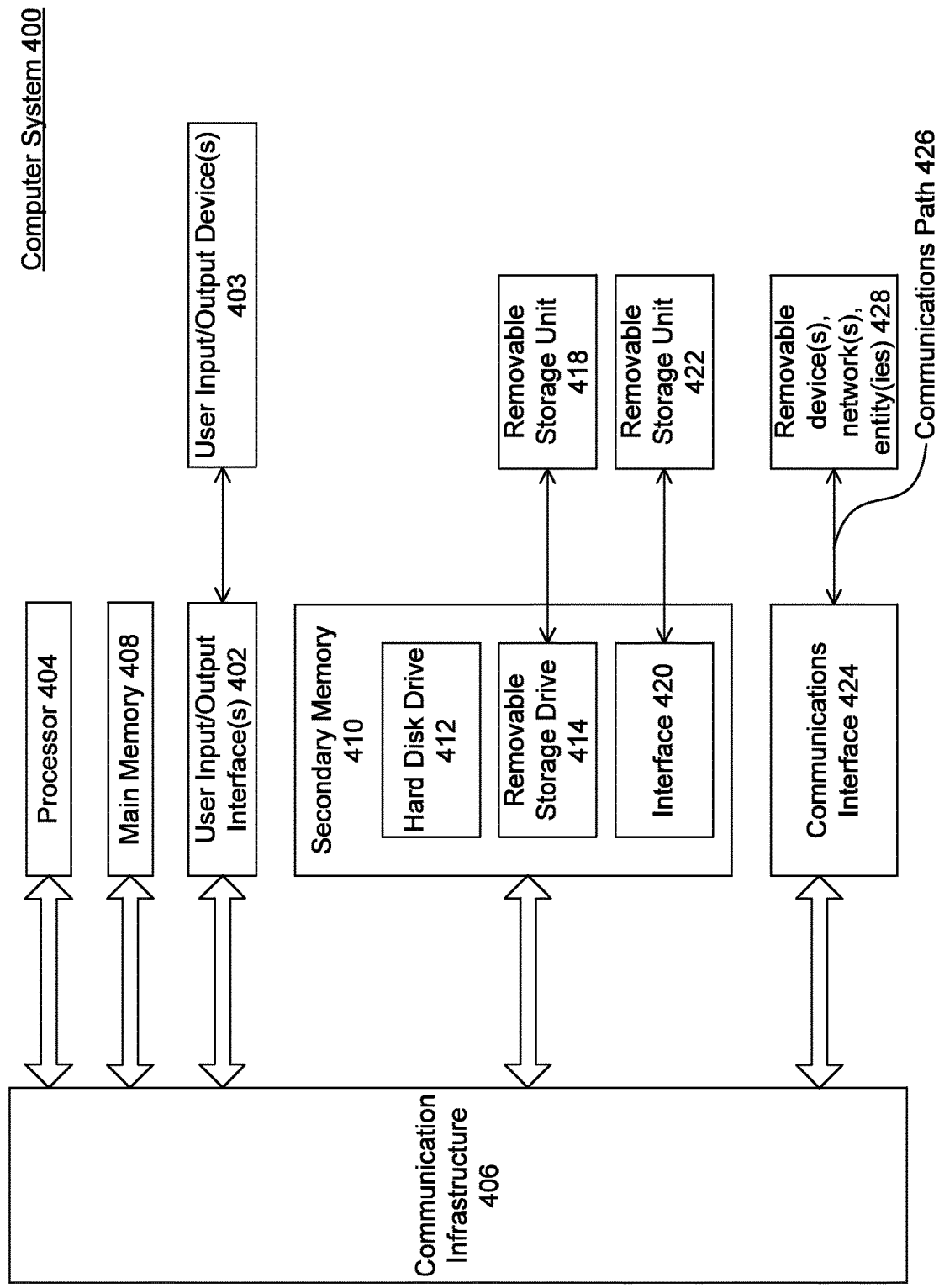
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:

detecting that a second mobile device is within a vicinity of a media device based on receipt of a text message from the second mobile device responsive to a ping transmitted to the second mobile device, wherein the media device is configured with a default set of media options for operating the media device based at least on a previous detection of the first mobile device being within the vicinity of the media device, wherein the default set of media options comprises a channel guide that includes programs available for viewing that are displayed in a default order, and wherein the second mobile device is registered with the media device prior to the detection;

determining a different set of media options corresponding to the second mobile device, wherein the different set of media options reflect a preference as to one or more programs of the channel guide;

prompting one of the first mobile device or second mobile device to resolve a conflict between a priority corresponding to the first mobile device and a priority corresponding to the second mobile device;

configuring the media device with the different set of media options based on a response to the prompting indicating that the second mobile device has a higher priority than the first mobile device, the different set of media options comprising the channel guide wherein the preferred programs are displayed with greater priority than other programs of the channel guide associated with the first mobile device;

providing an indication that the media device has been configured with the different set of media options; and providing an alert to the second mobile device, based on both the configuring and that the second mobile device is within the vicinity of the media device, that indicates that a plurality of content associated with the second mobile device that was available for viewing on the media device prior to the alert is available for viewing on the media device, and wherein the first mobile device is also within the vicinity and does not receive the alert;

wherein the detecting, determining, configuring, and providing are performed by one or more computers.

2. The method of claim 1, wherein the determining comprises:

determining that the different set of media options corresponding to the second mobile device is more restrictive in at least one aspect than the default set of media options corresponding to the first mobile device.

3. The method of claim 2, wherein the configuring comprises:

configuring the media device with the different set of media options, wherein the different set of media options comprises those media options that are enabled for both the first mobile device and the second mobile device.

4. The method of claim 1, wherein the mobile device is a remote control of the media device, and includes a microphone used to perform the detection.

5. A system, comprising:
a memory; and
at least one processor coupled to the memory and configured to:

detect that a second mobile device is within a vicinity of a media device based on receipt of a text message from the second mobile device responsive to a ping transmitted to the second mobile device, wherein the media device is configured with a default set of media options for operating the media device based at least on a previous detection of the first mobile device being within the vicinity of the media device, wherein the default set of media options comprises a channel guide that includes programs available for viewing that are displayed in a default order, and wherein the second mobile device is registered with the media device prior to the detection;

determine a different set of media options corresponding to the second mobile device, wherein the different set of media options reflect a preference as to one or more programs of the channel guide;

prompt one of the first mobile device or second mobile device to resolve a conflict between a priority corresponding to the first mobile device and a priority corresponding to the second mobile device;

configure the media device with the different set of media options based on a response to the prompt indicating that the second mobile device has a higher priority than the first mobile device, the different set of media options comprising the channel guide wherein the preferred programs are displayed with greater priority than other programs of the channel guide associated with the first mobile device;

provide an indication that the media device has been configured with the different set of media options; and provide providing an alert to the second mobile device, based on both the configuring and that the second mobile device is within the vicinity of the media device, that indicates that a plurality of content associated with the second mobile device that was available for viewing on the media device prior to the alert is available for viewing on the media device, and wherein the first mobile device is also within the vicinity and does not receive the alert.

6. The system of claim 5, wherein, to determine the different set of media options, the at least one processor is configured to:

determine that the different set of media options corresponding to the second mobile device is more restrictive in at least one aspect than the default set of media options corresponding to the first mobile device.

7. The system of claim 6, wherein, to configure the media device, the processor is configured to:

configure the media device with the different set of media options, wherein the different set of media options comprises those media options that are enabled for both the first mobile device and the second mobile device.

8. The system of claim 7, wherein, to provide the indication, the at least one processor is configured to change a current channel being provided by the media device corresponding to the default set of media options, wherein the current channel is disabled by the different set of media options.

9. The system of claim 5, wherein, to determine the different set of media options, the at least one processor is configured to:

determine that the second mobile device is registered to a child, and configure the media device with a set of child-safe media options, wherein the media device comprises both child-safe media options and adult-only media options.

10. A non-transitory computer-readable device having instructions stored thereon that, when executed by at least one computing device, cause the at least one computing device to perform operations comprising:
  detecting that a second mobile device is within a vicinity of a media device based on receipt of a text message from the second mobile device responsive to a ping transmitted to the second mobile device, wherein the media device is configured with a default set of media options for operating the media device based at least on a previous detection of the first mobile device being within the vicinity of the media device, wherein the default set of media options comprises a channel guide that includes programs available for viewing that are displayed in a default order, and wherein the second mobile device is registered with the media device prior to the detection;
  determining a different set of media options corresponding to the second mobile device, wherein the different set of media options reflect a preference as to one or more programs of the channel guide;
  prompting one of the first mobile device or second mobile device to resolve a conflict between a priority corresponding to the first mobile device and a priority corresponding to the second mobile device;
  configuring the media device with the different set of media options based on a response to the prompting indicating that the second mobile device has a higher priority than the first mobile device, the different set of media options comprising the channel guide wherein the preferred programs are displayed with greater priority than other programs of the channel guide associated with the first mobile device;
  providing an indication that the media device has been configured with the different set of media options; and
  providing an alert to the second mobile device, based on both the configuring and that the second mobile device is within the vicinity of the media device, that indicates that a plurality of content associated with the second mobile device that was available for viewing on the media device prior to the alert is available for viewing on the media device, and wherein the first mobile device is also within the vicinity and does not receive the alert.

11. The method of claim 1, wherein the preferred programs are displayed prior to the other programs in the channel guide.

12. The method of claim 1, wherein the providing the indication comprises:
  displaying the channel guide based on the preference in a first color, wherein the first color is different from a second color associated with the channel guide corresponding to the default set of media options.

13. The method of claim 2, wherein the providing comprises providing the channel guide wherein at least one channel associated with the default set of media options of the first media device that was visible on the channel guide prior to the detecting is not visible on the channel guide after the configuring.

14. The method of claim 1, wherein the determining comprises determining that the different set of media options corresponding to the second mobile device is more expansive than the default set of media options corresponding to the first mobile device; and
  wherein the providing comprises providing the channel guide wherein at least one channel associated with the different set of media options of the second mobile device that was not visible on the channel guide prior to the detecting is visible on the channel guide after the configuring.

15. The method of claim 1, wherein the different set of media options indicates that closed captioning is on, and wherein the default set of media options indicates that closed captioning is off.

16. The method of claim 11, wherein the priority of the media device is used to resolve a conflict in the media options between the first mobile device and the second mobile device.

17. The method of claim 1, wherein a light on the media device changes color based on the configuring from a first color to a second color, wherein the first color corresponds to a configuring based on the first mobile device, and wherein the second color corresponds to a configuring based on the second mobile device.

18. The method of claim 1, wherein the priority of the first mobile device relative to the second mobile device varies based on a day of the week.

19. The method of claim 1, wherein the ping is a broadcast ping transmit to a plurality of mobile devices including the second mobile device.

* * * * *